Figure 1:
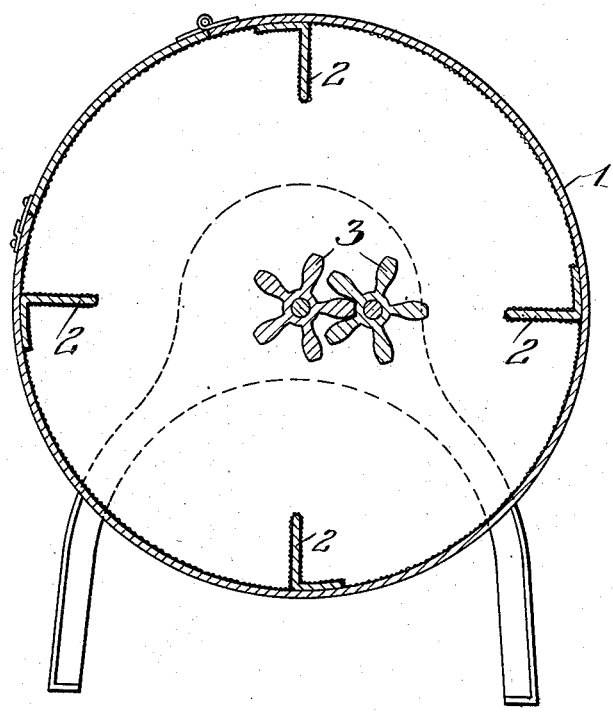

June 9, 1925.  O. I. CHORMANN  1,540,761

CHURN

Filed Jan. 5, 1924

INVENTOR.
Otto I. Chormann
BY
his ATTORNEY

Patented June 9, 1925.

1,540,761

UNITED STATES PATENT OFFICE.

OTTO I. CHORMANN, OF ROCHESTER, NEW YORK, ASSIGNOR TO THE PFAUDLER COMPANY, OF ROCHESTER, NEW YORK, A CORPORATION OF NEW YORK.

CHURN.

Application filed January 5, 1924. Serial No. 684,519.

*To all whom it may concern:*

Be it known that I, OTTO I. CHORMANN, a citizen of the United States, residing at Rochester, in the county of Monroe and State of New York, have invented certain new and useful Improvements in Churns; and I do hereby declare the following to be a full, clear, and exact description of the same, reference being had to the accompanying drawing, forming a part of the specification, and to the reference numerals marked thereon.

My present invention relates to closed receptacles such as churns, and similar apparatus for handling products containing fats when mixed with liquids such as water, and has for its object to provide an apparatus of this nature which will permit the contents of the receptacle to be agitated or moved in contact with the walls without adhering to the same.

Heretofore churns, particularly those operated by power and of the type embodying a rotary cylinder, and in some instances butter working rolls located within the cylinder, have usually been constructed of wood, but this form of apparatus is open to the objection that it is difficult to maintain it in a cleanly and sanitary condition, and furthermore the wooden agitating wings and the barrel itself are apt to disintegrate under the influence of the liquid, and particularly the acid contained in buttermilk, so that the elimination of these objectionable features is desirable.

In attempting to substitute for these wooden cylindrical receptacles those made of metal, such as steel lined with a hard glass or enamel lining, it was found difficult to operate them properly to effect the desired operation by reason of the fact that the butter fat would adhere to the walls and paddles to such a degree that the churning or manipulating operations were seriously interfered with. This objectionable feature was probably due to the fact that the butter fats would come directly in contact with the glass or enamel surface excluding any liquid, and that for some reason not readily explainable the butter would stick and in time become smeared on the walls and agitating ledges to such an extent that it was difficult to remove the same, and for this reason not only was there a lack of a proper churning and working action, but considerable quantities of butter were lost. I have discovered however that if the enamel or glass lining of the receptacle, or such portions thereof as are brought into direct contact with the butter fat are roughened or minutely pitted or otherwise rendered capable of maintaining a thin film of water or liquid between the butter fat and the ultimate surface of the container, that these objections can be eliminated and a perfectly sanitary and readily cleansable churn can be constructed. It is, of course, essential that such a churn or similar receptacle adapted for this purpose should have the glass or enamel surface of such a nature that it will not be soft enough to be abraded or worn by mechanical or chemical action to such a degree that the metal on which it is coated is liable at any time to be exposed as this would cause rust and discoloration of the product and ultimately the destruction of the container.

In carrying out my invention which I have demonstrated in a practical way, there are two methods by which the result can be accomplished. In one I form the lining in the containing vessel and the operating parts or wings which are brought in contact with the material operated upon of steel covered with an exceedingly hard glass or enamel coating, which coating necessarily has substantially the same coefficient of expansion as the metal upon which it is placed, this being the ordinary glass or enamel lining used in tanks or containers such as are made by the Pfaudler Company and others.

After this glass or enamel coating has been applied to these metal parts, the surface is cut or roughened by some suitable abrading process, such for instance, as by the use of a sand blast which removes the polish from the surface leaving minute pits or depressions therein, which in the use of the apparatus retain small quantities of the liquid, as the buttermilk or water, in sufficient quantity to prevent the adhesion of the fats and permit the various tumbling and working operations to take place. Instead of roughening the glass or enamel surface once formed for fusion, I have also found that if there is incorporated with the glass or enamel which is flowed and fused upon the metal surface, hard granular material, such for instance as particles of flint, feldspar or silica of such nature that when the fusible portions of the glass or enamel flows there will be innumerable projections that will form the minute recesses for the reception of water or liquid, and thereby prevent the adherence of the fats to the surface. For the reasons heretofore stated, it is of course advisable and necessary that the enameled surface be so hard and of such nature that it will not be materially affected by the contents of the churn or other receptacle.

Figure 2:
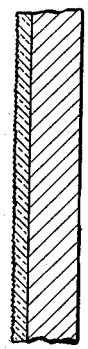

In the accompanying drawing, I have shown in Figure 1 a cross section of a type of cylindrical churn to which my invention has been applied with success, and in Figure 2 an enlarged section more or less diagrammatic of the receptacle body and the enameled surface thereof.

In said drawing, 1 indicates a rotatable cylinder constructed of metal and having on all portions of its inner surface a glass or enamel covering; 2 indicates lifting ledges or strips secured to the inner periphery of the cylinder, also made of metal and covered with enamel such as described; 3 indicates the butter working rollers arranged near the center of rotation of the cylinder adapted for independent rotation by the means usually employed for this purpose. These rollers themselves may be made of metal and covered with enamel such as described, or, as they are usually removable from the cylinders at the end of the churning operation, they may be if desired, constructed of wood or other suitable material.

The surface formed by sand blasting the enamel to remove the objectionable smooth polish obtained during the firing or heat treatment, may properly be termed a matt or unpolished surface, and it is in this sense that this term is used in this specification and some of the claims. While the matt surface could be formed by treating the enamel with hydrofluoric acid or similar material, the use of this is dangerous and I prefer the sand blasting method.

As the invention is particularly adapted for handling fatty materials, such as butter or oleomargarine in liquids, the receptacle must be sufficiently enclosed so that the contents will not be permitted to escape when the contents are agitated sufficiently to produce the results desired, whether the receptacle is bodily moved as in a rotary churn such as described, or the contents is moved about and in contact with the walls by other means. The invention resides in providing means for preventing the adhesion of the fatty materials to the walls as above pointed out.

I claim as my invention:

1. A closed container adapted for the treatment of fatty materials in liquids comprising a metal body provided with a lining of hard vitreous enamel having the portion of its surface exposed to the contents provided with minute pits or depressions adapted to contain liquid and prevent the adhesion of the contents.

2. A closed container adapted for the treatment of fatty materials and liquids comprising a metal body having an interior lining of vitreous enamel provided with a matt surface.

3. A closed, movable container adapted for the treatment of fatty materials in liquids comprising a metal body having metal ribs or bars therein, the portions of said body and the ribs that are exposed to the contents of the container being provided with a covering of vitreous enamel having a roughened or minutely pitted surface.

4. An improved closed container for fatty materials and a liquid, having a lining of vitreous enamel, the surface of which is provided with minute pits or recesses adapted to contain liquid and prevent the adhesion of the fatty material thereto in combination with means for agitating the container to bring the contents into contact with the said surface.

5. A churn body comprising a closed, revoluble metal cylinder and ribs on its interior periphery, the interior of the body and the surface of the ribs being provided with a covering of hard vitreous enamel from the surface of which the fire glaze has been removed.

OTTO I. CHORMANN.